May 4, 1948.  I. E. WIEGERS  2,441,050
FLUID PRESSURE BRAKE SYSTEM FOR TRACTOR-TRAILER VEHICLES
Filed Nov. 3, 1944   2 Sheets-Sheet 1
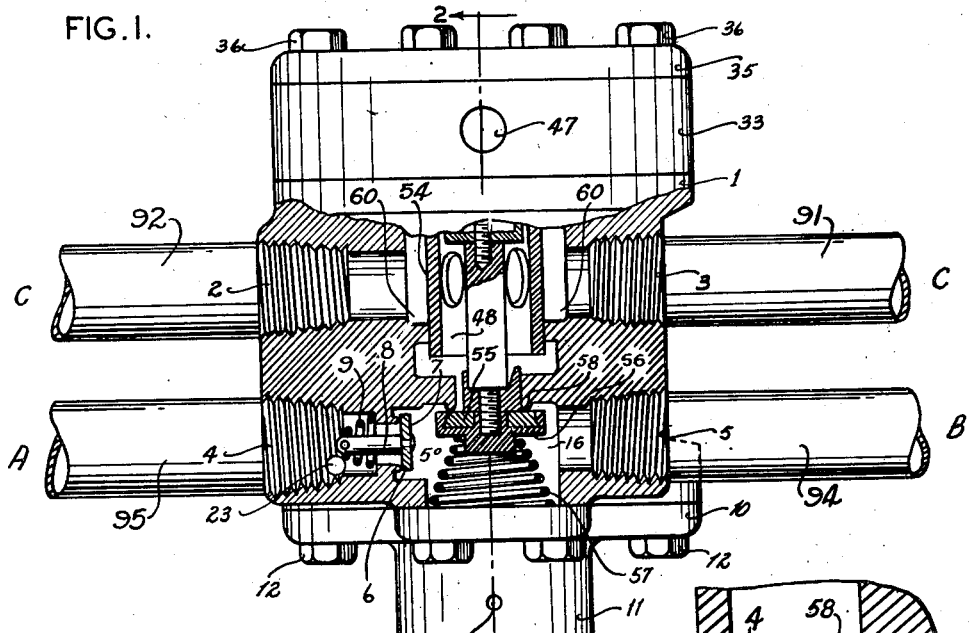
FIG. 1.
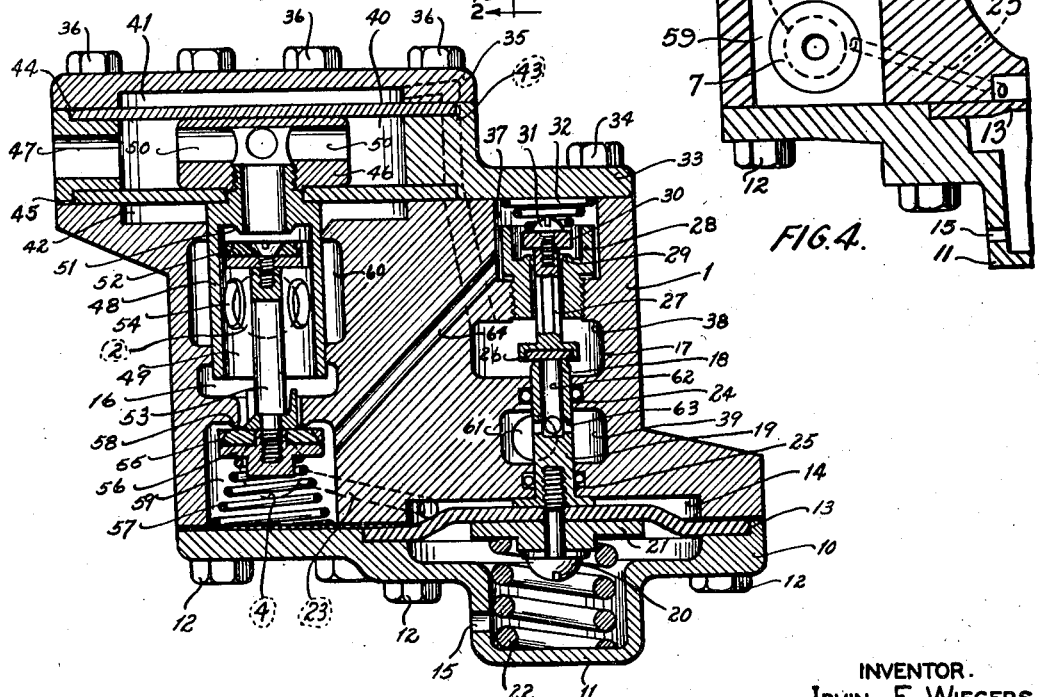
FIG. 2.
FIG. 4.
INVENTOR.
IRVIN E. WIEGERS
BY
ATTORNEY.

May 4, 1948.	I. E. WIEGERS	2,441,050
FLUID PRESSURE BRAKE SYSTEM FOR TRACTOR-TRAILER VEHICLES
Filed Nov. 3, 1944	2 Sheets-Sheet 2

INVENTOR.
IRVIN E WIEGERS
BY
ATTORNEY.

Patented May 4, 1948

2,441,050

UNITED STATES PATENT OFFICE 2,441,050

FLUID PRESSURE BRAKE SYSTEM FOR TRACTOR-TRAILER VEHICLES

Irvin E. Wiegers, Overland, Mo., assignor to Wagner Electric Corporation, St. Louis, Mo., a corporation of Delaware Application November 3, 1944, Serial No. 561,652

6 Claims. (Cl. 188—3)

This invention has reference to relay type pressure fluid control valves and in its more specific aspects is directed to a relay valve for governing the application of the trailer brakes of a tractor-trailer combination in the event of failure of the conduit connection between the two units or the failure of the pressure fluid supply on the tractor, or an abnormally low pressure source of pressure fluid supply.

One of the objects of this invention is to provide a relay valve to control the brakes of a tractor-trailer unit in the event of failure of the primary pressure fluid supply or a break in the conduit connection such that the trailer brakes will be instantly applied in the event of either or both failures.

Another object of the invention is to provide a valve organization that is responsive to pressure fluid failures in the tractor unit of the tractor-trailer combination.

A further object of the invention is the provision of a pressure fluid relay valve that is more rapid and efficient in its operation than any presently known device.

Still another object of the invention is to provide an emergency relay valve that provides an efficient means for controlling the application of reserve pressure fluid to the trailer brakes.

Another and still further object of the invention is to provide an emergency relay valve in which the full reserve pressure fluid is applied to the trailer brakes in the event of a failure of primary pressure fluid supply.

A still further object of the invention is to provide a better degree of balancing of pressure fluids in the several conduits and control chambers of an emergency relay valve.

Other and further objects of the invention will occur to those skilled in the arts to which this application pertains as the description proceeds, which, taken in connection with the accompanying drawings, sets forth a preferred embodiment of the invention but such disclosure is not to be construed as a limitation of the invention which is limited only by the appended claims and any and all modifications, alterations and variations of structure coming within the spirit and scope thereof are deemed to be included herein.

In the drawings:

Figure 1 is an elevational view of the improved emergency relay valve with parts in section to show details;

Figure 2 is a view taken substantially along the line 2—2 of Figure 1;

Figure 4 is an enlarged view of a detail of Figure 2.

Figure 3:
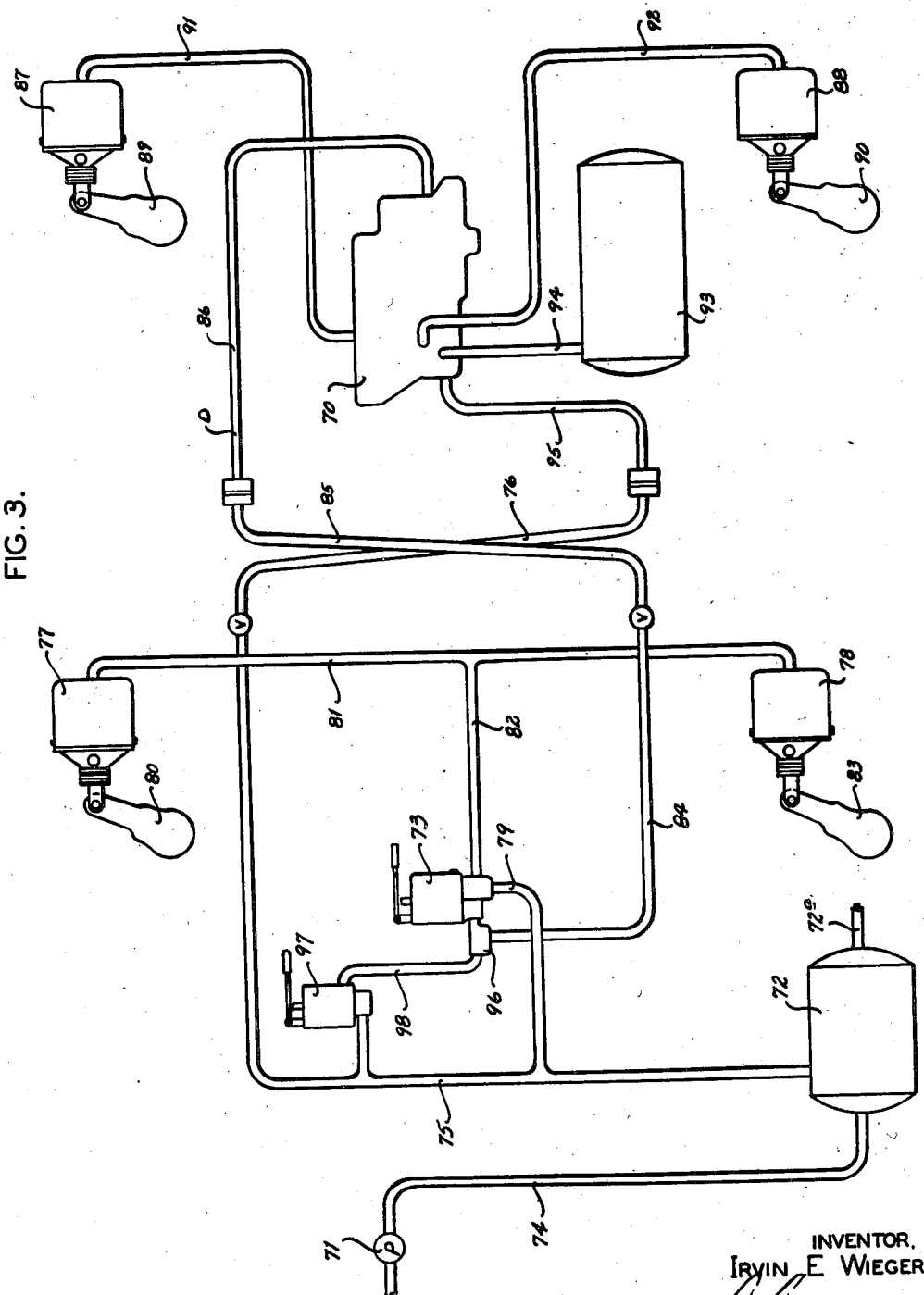
Figure 3 shows a schematic brake and conduit assembly incorporating the improved valve.

The achievement of the above objects and advantages is made possible in the valve structure disclosed in the accompanying drawings in which numeral 1 indicates a housing provided with ports 2, 3, 4, and 5 to which are connected the pressure fluid conduits of a brake control system as hereinafter set forth in greater detail. Port 4 is provided with a valve seat 6. Engageable with valve seat 6 is a normally closed check valve 7 having a stem 8 with a spring 9 on the opposite side of seat 6, spring 9 being appropriately fixed with respect to the stem so as to urge the valve 7 to closed position.

Secured to the lower end of housing 1 is a cover plate 10 provided with a counterbored boss 11 which is secured to the housing 1 by means of a plurality of screws 12, 12. Arranged in the largest of the counterbores in the cover plate 10 is the emergency valve diaphragm 13 which is of a thickness sufficient to be firmly clamped in position when screws 12, 12 are tightened. Coaxially disposed with respect to the next smaller of the counterbores in plate 10 is a bore or chamber 14 formed in housing 1. The diaphragm 13, therefore, divides the two coaxial chambers in which chamber 14 in housing 1 is closed and the chamber in cover 10 is open to the atmosphere by way of vent 15.

The housing 1 is provided with bores 16 and 17 each of which is appropriately shaped or contoured to receive suitable valve assemblies. The several valves control the flow of pressure fluid between the several bores in the housing, the emergency reserve supply, the primary source of pressure fluid in the tractor-trailer combination and to the brake operating motors.

The valve in bore 17 is a compound valve. One part of the valve comprises a movable seat 18 formed on stem 19 secured to the emergency valve diaphragm 13 by screw 20 with the flange on stem 19 placed against the diaphragm 13 and element 21 placed on the opposite side of the diaphragm, said flange and element 21 reinforcing the diaphragm 13. Spring 22 is disposed between element 21 and the bottom of counterbore 11 in cover 10 and urges the valve 26 to closed position.

Under certain conditions of operation, pressure fluid is admitted to chamber 14 from the port 4 by means of duct or passageway 23 and urges the diaphragm 13 downward to withdraw seat 18 from its associated normally closed valve 26. To prevent leakage from chamber 14 to chamber 39 around stem 19 and vice versa, seal 24 is provided which acts to prevent such leakage. Seal 25 also surrounding stem 19 acts to prevent transfer of pressure fluid around stem 19 or pressure fluid exchange between chambers 38 and 39.

The valve element 26 engageable with seat 18 is secured to a stem 27 provided with a suitable valve receiving socket. The stem is received in a bushing 28 threaded into one of the internal collars in bore 17. The stem 27 is grooved or splined to permit the passage of pressure fluid and is somewhat smaller in diameter than the bore in bushing 28.

Internally of the bushing and concentric with the bore therein is a valve seat 29 which is engageable with a normally open emergency valve 30 secured to stem 27 by means of screw 31 which is the other part of the compound valve. Emergency valve 30 is urged downwardly by means of a spring 32, one end of which engages the emergency valve 30 and the other end of which engages element 33 of the closure assembly secured to the housing 1 by means of a plurality of screws 34, only one of which is shown. From the foregoing it is evident that bore 17 is divided into three chambers 37, 38, and 39, each of which is connected to other chambers in the valve or to ducts previously or to be subsequently discussed.

As previously indicated, the element 33 of the closure assembly has a cover plate 35 secured to the housing 1 and to the element 33 of the closure assembly by a plurality of screws 36. The enlarged portion of element 33 has a double counterbore therein, the smaller bore of which is concentric with a bore or cavity in the cover element 35 and is also concentric with a bore formed in the housing 1 which may be considered a part of bore 16. Disposed in the largest of the counterbores in the enlarged portion of the element 33 is a pilot diaphragm 44 which is firmly clamped in position by the cover plate 35 when the screws 36 are tightened. The other counterbore in the enlarged portion of 33 has the relay valve diaphragm 45 arranged therein which is clamped in position against housing 1 when the aforementioned screws 36 are tightened. The arrangement of the diaphragms 44 and 45 in the respective counterbores divides the previously described concentric bores in housing 1, the enlarged portion of closure member 33 and the cover plate 35 into three chambers designated as 40, 41, and 42, respectively, all as more clearly shown in Figure 2 of the drawings. A duct 47 formed in the enlarged portion of 33 connects the chamber 40 with the atmosphere and duct 43 connects chamber 38 with the chamber or cavity 41.

The bore 16 has arranged therein a compound valve structure which originates in a cage 48 held in the upper portion of bore 16 in two collar-like projections formed therein and slidably disposed in said bore. The upper end of the cage, as illustrated, is bored and threaded in order to receive a head portion 46 having bores 50 therein which connect with the bore formed in the cage 48 and thence forms a passageway from the interior of the cage and the bore 16 to the atmosphere. The upper end of cage 48 has formed therein a valve seat 51 cooperating with the normally open exhaust valve 52 arranged in a valve seat holder threadedly secured by means of a stud to the valve stem 53. The stem 53 is concentrically disposed within the opening or space 49 formed in cage 48.

In order to have a passageway between the chamber 60 which constitutes the upper portion of the bore 16 formed by the space between the collars in the said bore in which the cage 48 rests and is slidably disposed, the cage 48 is formed with a plurality of apertures 54 in order to provide such a passageway for the exhaustion of any pressure fluid therefrom to the atmosphere when the normally closed exhaust valve 52 is in proper or open position.

On the lower end of stem 53 is an inlet valve 55 arranged in a holder 56 threaded to the lower end of stem 53 and a spring 57 engages with the holder 56 to urge the entire assembly upward to cause the valve 55 to engage with valve seat 58 formed on the lower collar in bore 16. The lower collar on which valve seat 58 is formed in connection with valve 55 forms another chamber 59 in bore 16 in which the valve 55 and its associated devices are arranged. The spring 57, as indicated, urges the valve 55 into engagement with valve seat 58 to thereby govern the opening and closing of the passageway to chamber 60 formed in the upper portion of the bore. A duct 64 is formed in housing 1 and connects the chamber 59 with chamber 37 for purposes to be hereinafter more fully set forth.

The opening and closing of exhaust valve 52 is determined by pressure conditions existing in chamber 41 and since the head 46 is arranged between the diaphragms 44 and 45, it is clear that any axial motion of the cage 48 with respect to the bore in which it is mounted is under the influence of pressure in chamber 41 to thereby govern the opening and closing of the valve 52 on the disengagement of exhaust valve 52 from its seat 51. The valve 55, being under the influence of spring 57, likewise has its operation dependent upon the open or closed position of the exhaust valve 52 in order to control the flow of pressure fluid through the several ducts and passageways in the valve. Pressure in chambers 60 and 42 acts on the diaphram 45 when the pressure in 41 is low and urges the diaphragms 44 and 45 upward, thereby assisting in opening the exhaust valve 52. Pressure fluid flows between chambers 42 and 60 by leaking or bleeding between cage 48 and the housing 1 because cage 48 does not snugly fit therein.

The valve previously discussed is shown organized into a tractor-trailer unit schematically illustrated in Figure 3 and is therein designated by the numeral 70. Application valve 73 governs the admission of pressure fluid to the tractor brake motors 77 and 78 as well as the admission of pressure fluid to motors 87 and 88 on the trailer. Each of these motors has cam arms 80, 83, 89, and 90 connected to their respective motors to apply the motion produced by the motors to the brakes (not shown) associated therewith.

Pressure fluid derived from pump 71 is conducted to reservoir 72 by conduit 74 and is conducted therefrom to the inlet side of the manually operated application valve 73 by means of conduits 75 and 79. One application port of the valve 73 is connected by means of conduits 81 and 82 to the brake motors 77 and 78 to operate the tractor brakes. The other application port of valve 73 is connected by means of conduit 84, coupling 85 including appropriate valves, etcetera, and conduit 86 to port 61 of valve 70. Pressure fluid from reservoir 72 is transmitted directly to valve 70 by means of conduit 75, coupling 76 including appropriate valves, etcetera, and conduit 95 to port 4. Conduit 94 connects port 5 of valve 70 with trailer reservoir 93 and conduits 91 and 92 connect ports 2 and 3 with the trailer brake motors 87 and 88. Pump 71 and reservoir 72 are collectively regarded as a source of pressure fluid supply for the operation of the brake system.

As illustrated in Figures 1 and 2 of the drawings, the device is in inactive position in which there is no air pressure in the several chambers and with valve 7 closed. When installed in a tractor-trailer combination, as above set forth, the valve has its port 4 connected to the tractor emergency line 95 leading from reservoir 72 and including conduit 75 and coupling connection 76. The trailer reservoir is connected to port 5 by means of conduit 94; the trailer service line comprising conduit 86, coupling connection 85, conduit 84, etcetera, is connected to port 61 (Figure 2); and the power cylinder lines 91 and 92 leading to the brake motors 87 and 88 are each connected to ports 2 and 3, respectively.

It will be noted that conduits 91 and 92 originate in chamber 60 in valve 70; conduit 86 is connected to duct 61 which terminates in chamber 39; conduit 95 terminates at the port 4 from which pressure fluid can flow into chamber 59 past check valve 7 which prevents any reverse flow from chamber 59 back into port 4; and conduit 94 originates in port 5 associated with the chamber 59. Passageways 23, 43, and 64 connect several of the chambers and by a selective or predetermined positioning of the valves 26, 30, 52, and 55 regulate the flow of pressure fluid from reservoir 72 to reservoir 93, from reservoir 72 to the several brake motors, and from reservoir 93 to certain selected brake motors under predetermined conditions.

Referring now to the operation of the device, it is assumed that reservoirs 72 and 93 are empty. Pump 71 is now placed in operation and pressure fluid will exhaust from it through conduit 74 into the reservoir 72, the ultimate pressure in the reservoir being limited by the safety valve 72a. Pressure fluid will flow from reservoir 72 through conduit 75, coupling 76 and conduit 95 into the emergency relay valve 70 through the port 4 and will there divide, one part going past check valve 7 thence into chamber 59 and by means of conduit 94 connected to port 5 into the trailer reservoir 93. This flow will continue until the pressure in reservoir 93 is nearly equal to the pressure in reservoir 72, the difference being that necessary to actuate check valve 7. The other path of pressure fluid flow is through duct 23, leading from conduit 95 at port 4 ahead of check valve 7 into chamber 14. The force produced depresses emergency valve diaphragm 13 compressing spring 22, and develops sufficient pressure to unseat the valve 26 which remains open as long as pressure is exerted on the emergency valve diaphragm 13 to overcome spring 22.

The spring 32 closes valve 30 immediately after the unseating of valve 26, thereby preparing the system for operation by application valve 73. If valve 73 is placed in application position, pressure fluid will flow from reservoir 72 through conduit 79 to conduit 82 and conduit 81 to the tractor brake actuating motors 77 and 78. Simultaneously pressure fluid will flow from the application valve 73 through conduit 84, coupling 85 and conduit 86 to port 61 of emergency relay valve 70, into chamber 39. It continues to flow through passageways 63 and 62, valve 26 into the chamber 38, thence through duct 43 into the chamber 41 where it exerts pressure on pilot diaphragm 44. This causes valve 52 to close and immediately thereafter opens valve 55. When valve 55 is opened, the pressure fluid in chamber 59, supplied from either reservoir 72 or 93, flows past valve 55, through ports 54 in cage 48 into chamber 60 and thence through ports 3 and 2 respectively connected to conduits 91 and 92 to the trailer brake motors 87 and 88.

Pressure fluid in chamber 60 will leak or bleed between cage 48 and the main valve body into chamber 42 and when the force on relay valve diaphragm 45 becomes equivalent to the opposing force on pilot diaphragm 44, valve 55 is closed by spring 57 thereby disconnecting the source of supply for both relay valve diaphragm 45 and brake motors 87 and 88, thus maintaining the brakes applied with pressure fluid of a given value. If leakage occurs from either the brake motors 87 and 88 or the conduits connected thereto, a pressure unbalance between chambers 41 and 42 is created which permits pressure fluid in chamber 41 to again reopen valve 55 to restore normal operating pressure in said brake motors.

If application valve 73 is moved to the exhaust position, pressure fluid will be released from chamber 41 through duct 43, chamber 38, valve 26, passageways 62, 63, port 61, conduit 86, coupling 85, conduit 84 and finally the exhaust port of application valve 73 to atmosphere. Reaction of the pressure fluid trapped in the braking system between motors 87 and 88 and valve 55 will force diaphragm assembly 44 and 45 upward and unseat valve 52. The trapped pressure fluid escapes from motors 87 and 88 by passing through ports 54 of cage 48, valve 52, ducts 50 and vent 47 to atmosphere.

Pressure fluid values for the system comprising inlet valve 55 and motors 87 and 88 will be maintained equivalent to those released by application valve 73 to relay valve 70 by the sequence of operations just described.

If a break occurs in coupling 76, pressure fluid from chamber 14 escapes to atmosphere through duct 23, it being connected to conduit 95 ahead of check valve 7, or, if the pressure in reservoir 72 is abnormally low, the force on emergency valve diaphragm 13 is relieved. When this force has been relieved the action of spring 22 forces the emergency valve diaphragm 13 upward, closes valve 26 and immediately thereafter opens valve 30. This action prevents the escape of any fluid from auxiliary reservoir 93 through port 61. Pressure fluid from trailer reservoir 93 now flows though conduit 94 into port 5, chamber 59, thence through duct 64 into chamber 37 past valve 30, through the aperture receiving member 27, into chamber 38 thence through duct 43 into chamber 41. The action of this pressure fluid on pilot diaphragm 44 initiates a similar chain of action to that described in the application of pressure fluid to the brake motors 87 and 88 by the actuation of valve 73 to application position. The motors 87 and 88 remain actuated or in a "brake applied" position until normal pressure is restored in reservoir 72 whereupon the emergency valve diaphragm 13 will be depressed to open valve 26, permitting pressure fluid to be exhausted from motors 87 and 88 and returning the entire system to a normal operating state under the control of application valve 73.

Normally valve 73 is constructed and arranged with a time lag such that the trailer brake motors 87 and 88 will be actuated ahead of tractor brake motors 77 and 78, thereby securing most satisfactory operation. This expedient is well known and understood in the arts relating to prime mover and trailer units and forms no part of this invention.

Under certain conditions it may be desirable to actuate the trailer brakes without reference to the application valve 73. An auxiliary valve or a two-way valve 96 is provided on valve 73 which leads to one side of a second manual valve 97 by means of conduit 98. The other side of valve 97 is connected to the source of supply in tank 72 by means of conduit 99 and a portion of conduit 75. In operation, valve 96 by-passes valve 73 to admit pressure fluid to conduit 84 when valve 97 is actuated. The operation of emergency relay valve 70 with respect to the trailer brakes is identical to that described above. Valve 73 is normally foot operated and valve 97 is normally hand operated. When valve 97 is actuated, the tractor brake motors 77 and 78 are not energized. When valve 73 is actuated, all the brake motors will be energized as described above.

It is thus apparent that an emergency relay valve device has been provided which is more responsive to disturbances occurring in the pressure fluid supply such as an abnormally low pressure source of pressure fluid or a failure of the conduits connecting the tractor-trailer device and making certain that the trailer brakes will be applied in the event that any of the several difficulties occur.

Having fully described my invention, that which I claim as novel and desire to protect by Letters Patent of the United States is:

1. A brake system comprising a main pressure fluid reservoir; an auxiliary pressure fluid reservoir; fluid-operated brake actuating means; a normally closed inlet valve to control the flow of pressure fluid from said reservoirs to said brake actuating means; a normally open exhaust valve to control the exhaust of pressure fluid from said brake actuating means; a first diaphragm means to sequentially actuate said exhaust and inlet valves; a manually operable valve to control the operation of said first diaphragm means; a normally closed valve interposed between said manually operable valve and said first mentioned diaphragm means; a normally open emergency valve interposed between said diaphragm means and said auxiliary reservoir; and a second diaphragm means to sequentially actuate said normally closed valve and said emergency valve, said second diaphragm means operated by pressure fluid derived from said main reservoir.

2. A brake system comprising a main pressure fluid reservoir; an auxiliary pressure fluid reservoir; fluid-operated brake actuating means; a normally closed inlet valve to control the flow of pressure fluid from said reservoirs to said brake actuating means; a normally open exhaust valve to control the exhaust of pressure fluid from said brake actuating means; a first diaphragm means to sequentially actuate said exhaust and inlet valves; a manually operable valve to control the operation of said first diaphragm means; a normally closed valve interposed between said manually operable valve and said first mentioned diaphragm means; a normally open emergency valve interposed between said diaphragm means and said auxiliary reservoir; a second diaphragm means to sequentially actuate said normally closed valve and said emergency valve, said second diaphragm means operated by pressure fluid derived from said main reservoir; and means operative when said second diaphragm means is inoperative to actuate said normally closed valve to closed position and said normally open emergency valve to open position to establish communication between said auxiliary reservoir and said first diaphragm means.

3. A brake system comprising a main pressure fluid reservoir mounted on a tractor; an auxiliary pressure fluid reservoir mounted on a trailer; fluid-operated brake actuating means for the trailer; a normally closed inlet valve on said trailer to control the flow of pressure fluid from said reservoirs to said brake actuating means; a normally open exhaust valve on said trailer to control the exhaust of pressure fluid from said brake actuating means; a first diaphragm means to sequentially actuate said inlet and exhaust valves; a manually operable valve on the tractor to control the flow of pressure fluid from said main reservoir to said first mentioned diaphragm means; a normally closed valve on the trailer interposed between said manually operable valve and said first mentioned diaphragm means; a normally open emergency valve on the trailer interposed between said first diaphragm means and said auxiliary reservoir; and a second diaphragm means operable by pressure fluid derived from said main reservoir to sequentially actuate said normally closed valve to open position and said emergency valve to closed position to thereby enable said manually operable valve to control said first mentioned diaphragm means.

4. A brake system comprising a main pressure fluid reservoir; an auxiliary pressure fluid reservoir; fluid-operated brake actuating means; a normally closed inlet valve to control the flow of pressure fluid from said reservoirs to said brake actuating means; a normally open exhaust valve to control the exhaust of pressure fluid from said brake actuating means; means connecting said exhaust and inlet valves; a pilot diaphragm to actuate said inlet and exhaust valves to open and closed positions, respectively; an application valve to control the flow of pressure fluid from said reservoir to said pilot diaphragm; a relay diaphragm to actuate said exhaust valve to open position by pressure fluid in said brake actuating means after pressure is relieved from said pilot diaphragm; a spring to close said inlet valve after said pilot diaphragm is inoperative thereon; a normally closed valve interposed between said application valve and said pilot diaphragm; an emergency valve interposed between said auxiliary reservoir and said pilot diaphragm; means connecting said normally closed valve and emergency valve; an emergency valve diaphragm responsive to pressure fluid in said main reservoir to actuate said normally closed valve and said emergency valve; and means, when said pilot diaphragm is inoperative, to close said normally closed valve and open said emergency valve to establish communication between said auxiliary reservoir and said pilot diaphragm to thereby actuate said pilot diaphragm and to enable said brake actuating means to be operated by pressure fluid in said auxiliary reservoir.

5. A brake system comprising a main pressure fluid reservoir; an auxiliary pressure fluid reservoir; fluid-operated brake actuating means; an emergency relay valve housing; a normally closed inlet valve in said housing to control the flow of pressure fluid from said reservoirs to said brake actuating means; a cage movable in a bore in said housing and having a valve seat therein; a normally open exhaust valve in said cage engageable with said seat to control the exhaust of pressure fluid from said brake actuating means; means connecting said inlet and exhaust valves; a pilot diaphragm to sequentially actuate said exhaust valve to closed position and said inlet valve to open position; a spring to close said inlet valve after said pilot diaphragm is inoperative thereon; a relay diaphragm responsive to pressure fluid in said brake system, the pressure fluid bleeding between said housing and said cage until the pressure on said relay diaphragm is substantially equal the pressure on said pilot diaphragm to thereby enable said spring to close said inlet valve while said exhaust valve remains closed; an application valve to control the flow of pressure fluid from said main reservoir to said pilot diaphragm, said spring controlling the flow of pressure fluid to said brake actuating means upon leakage of pressure fluid from said brake actuating means, and said pressure fluid in said brake system acting on said relay diaphragm upon the exhaust of pressure fluid from said pilot diaphragm to thereby open said exhaust valve; a normally closed valve in said housing interposed between said application valve and said pilot diaphragm; an emergency valve interposed between said auxiliary reservoir and said pilot diaphragm; means connecting said normally closed valve and said emergency valve; an emergency valve diaphragm responsive to pressure fluid in said main reservoir to sequentially open said normally closed valve and close said emergency valve; and means operative when said emergency valve diaphragm is inoperative to reversely operate said normally closed valve and said emergency valve to establish communication between said auxiliary reservoir and said pilot diaphragm to actuate same so that said brake actuating means may be operated by pressure fluid in said auxiliary reservoir.

6. An emergency relay valve comprising a housing; a normally closed inlet valve in said housing; a normally open exhaust valve in said housing; means connecting said inlet and exhaust valves; a pilot diaphragm to actuate said inlet valve to open position and said exhaust valve to closed position; a relay diaphragm associated with said exhaust valve to open same; a spring to close said inlet valve after said pilot diaphragm is inoperative thereon; a normally closed valve in said housing to control the flow of pressure fluid to said pilot diaphragm; an emergency valve connected to said normally closed valve to control the flow of pressure fluid from an auxiliary pressure fluid supply to said pilot diaphragm; an emergency valve diaphragm to sequentially actuate said normally closed valve and said emergency valve to open and closed positions; and means to reversely actuate said normally closed valve and said emergency valve after said emergency valve diaphragm is inoperative.

IRVIN E. WIEGERS.

REFERENCES CITED

The following references are of record in the file of this patent:

UNITED STATES PATENTS

| Number | Name | Date |
|---|---|---|
| 1,001,040 | Johnsonbaugh | Aug. 22, 1911 |
| 1,919,442 | McCune | July 25, 1933 |
| 2,248,437 | Robinson | July 8, 1941 |
| 2,411,406 | Affleck | Nov. 19, 1946 |
| 2,289,559 | Turek | July 14, 1942 |